United States Patent
Hiraiwa

(10) Patent No.: US 9,033,836 B2
(45) Date of Patent: May 19, 2015

(54) DRIVE DEVICE FOR HYBRID ELECTRIC VEHICLE

(71) Applicant: FINEMECH CO., LTD., Yokohama (JP)

(72) Inventor: Kazuyoshi Hiraiwa, Yokohama (JP)

(73) Assignee: FINEMECH CO., LTD., Yokohama (JP)

( * ) Notice: Subject to any disclaimer, the term of this patent is extended or adjusted under 35 U.S.C. 154(b) by 154 days.

(21) Appl. No.: 13/644,521

(22) Filed: Oct. 4, 2012

(65) Prior Publication Data

US 2013/0090202 A1      Apr. 11, 2013

(30) Foreign Application Priority Data

| Oct. 8, 2011 | (JP) | ................................ | 2011-223515 |
| Nov. 4, 2011 | (JP) | ................................ | 2011-242747 |
| Dec. 1, 2011 | (JP) | ................................ | 2011-263191 |

(51) Int. Cl.
*B60K 6/365* (2007.10)
*B60K 6/445* (2007.10)
*F16H 3/72* (2006.01)
*F16H 37/08* (2006.01)
*F16H 37/10* (2006.01)

(52) U.S. Cl.
CPC .......... *B60K 6/365* (2013.01); *F16H 2200/0021* (2013.01); *F16H 2200/2084* (2013.01); *B60K 6/445* (2013.01); *F16H 3/728* (2013.01); *F16H 2037/0873* (2013.01); *F16H 2037/101* (2013.01); *F16H 2200/2005* (2013.01); *F16H 2200/2007* (2013.01); *F16H 2200/201* (2013.01); *F16H 2200/2038* (2013.01); *F16H 2200/2041* (2013.01); *F16H 2200/2064* (2013.01); *F16H 2200/2097* (2013.01); *F16H 2200/2082* (2013.01); *B60Y 2400/421* (2013.01); *Y02T 10/6239* (2013.01)

(58) Field of Classification Search
CPC .......... F16H 3/728; F16H 2037/00–2037/128; F16H 2200/0021; B60K 6/365; B60K 6/445
USPC ............................ 475/1–10; 180/65.235, 65.7
See application file for complete search history.

(56) References Cited

U.S. PATENT DOCUMENTS

| 6,478,705 | B1 |   | 11/2002 | Holmes et al. |
| 7,192,373 | B2 | * | 3/2007 | Bucknor et al. .................. 475/5 |
| 7,367,911 | B2 | * | 5/2008 | Raghavan et al. ......... 180/65.25 |
| 7,479,080 | B2 | * | 1/2009 | Usoro ............................... 475/5 |

(Continued)

FOREIGN PATENT DOCUMENTS

JP           11227476 A   *   8/1999

OTHER PUBLICATIONS

Machine translation of JP11227476A dated Aug. 13, 2014.*

*Primary Examiner* — Tisha Lewis
(74) *Attorney, Agent, or Firm* — Wenderoth, Lind & Ponack, L.L.P.

(57) ABSTRACT

A drive device for a hybrid electric vehicle includes a power splitting gear set including a first planetary gear set having three rotatable elements of a first sun gear, a first ring gear and a first pinion carrier, and first and second motors/generators. An input shaft is connectable with the first ring gear. The output shaft is connected with the first pinion carrier. The first motor/generator is connected with the first sun gear. The second motor/generator is connectable with the output shaft and the first ring gear. The first ring gear is capable of being fixed to a stationary part.

19 Claims, 13 Drawing Sheets

(56) References Cited

U.S. PATENT DOCUMENTS

| | | | |
|---|---|---|---|
| 8,449,420 B2 * | 5/2013 | Seo et al. | 475/5 |
| 2006/0169502 A1 * | 8/2006 | Kano et al. | 180/65.2 |
| 2006/0201725 A1 * | 9/2006 | Kano et al. | 180/65.2 |

* cited by examiner

FIG. 5

|  |  | C | B | S | OWC1 | OWC2 | M/G1 | M/G2 |
|---|---|---|---|---|---|---|---|---|
| EV | HH | ON | ON |  | ON | ON | — | — |
|  | E-1 | (ON) | ON |  | ON |  | ON | — |
|  | E-2 |  |  |  |  | ON | — | ON |
|  | E-3 |  | ON |  | ON | ON | ON | ON |
|  | E-4 | ON |  |  |  |  | ON | ON |
|  | E-R |  |  | ON |  |  |  | ON |
| EB |  | ON |  |  |  |  | GE | GE |
| HEV | H-1 |  |  |  | ON | ON | GE | ON |
|  | H-2 |  | ON |  |  | ON | GE | ON |
|  | H-3 | ON |  |  | ON | ON |  |  |
|  | H-4 | ON |  |  | ON |  | ON | GE |
|  | H-5 | ON | ON |  |  | ON |  |  |
|  | H-6 | ON | ON |  |  |  | ON | GE |
|  | H-R |  | ON | ON |  |  | GE | ON |

FIG. 9

|  |  | C | B | S | OWC1 | OWC2 | M/G1 | M/G2 |
|---|---|---|---|---|---|---|---|---|
| EV | HH | ON | ON |  | ON | ON | — | — |
|  | E-1 | (ON) | ON |  | ON |  | ON | — |
|  | E-2 |  |  |  |  | ON | — | ON |
|  | E-3 |  | ON |  | ON | ON | ON | ON |
|  | E-4 | ON |  |  |  |  | ON | ON |
|  | E-R |  |  | ON |  |  |  | ON |
| EB |  | ON |  |  |  |  | GE | GE |
| HEV | H-1 |  |  |  | ON | ON | GE | ON |
|  | H-2 |  | ON |  |  | ON | GE | ON |
|  | H-3 | ON |  |  | ON | ON |  |  |
|  | H-4 | ON |  |  | ON |  | ON | GE |
|  | H-5 | ON | ON |  |  | ON |  |  |
|  | H-6 | ON | ON |  |  |  | ON | GE |
|  | H-R |  | ON | ON |  |  | GE | ON |

FIG. 11

|  | | C1 | C2 | L1 | L2 | OWC1 | OWC2 | M/G1 | M/G2 |
|---|---|---|---|---|---|---|---|---|---|
| | HH | ON | ON | | ON | | ON | — | — |
| EV | E-1 | (ON) | ON | | ON | | | ON | — |
| | E-2 | | | | | | ON | — | ON |
| | E-3 | ON | | | | | | ON | ON |
| | E-R | | ON | ON | ON | | | ON | ON |
| EB | | ON | | | | | | GE | GE |
| HEV | H-1 | | | | | ON | ON | GE | ON |
| | H-2 | ON | | | | ON | ON | | |
| | H-3 | | | | | ON | | HD | |
| | H-4 | ON | | | | ON | | ON | GE |
| | H-R | | | ON | | ON | | GE | ON |

FIG. 14

|  |  | C1 | C2 | S | L | OWC | M/G1 | M/G2 |
|---|---|---|---|---|---|---|---|---|
| EV | HH | ON | ON |  | ON | ON | — | — |
|  | E-1 |  |  |  |  | ON | — | ON |
|  | E-2 |  | ON |  |  | ON | ON | ON |
|  | E-R | ON |  | ON | ON |  | ON | ON |
| EB |  |  | ON |  |  |  | GE | GE |
| HEV | H-1 | ON |  |  |  | ON | GE | ON |
|  | H-2 | ON | ON |  |  | ON |  |  |
|  | H-3 | ON | ON |  |  |  | ON | GE |
|  | H-R | ON |  | ON |  |  | GE | ON |

FIG. 16

| | | C1 | C2 | S | OWC1 | OWC2 | M/G1 | M/G2 |
|---|---|---|---|---|---|---|---|---|
| EV | HH | ON | ON | | | ON | — | — |
| | E-1 | | | | | ON | — | ON |
| | E-2 | ON | | | ON | | ON | — |
| | E-3 | ON | | | ON | ON | ON | ON |
| | E-4 | | ON | | | | ON | ON |
| | E-R | | ON | ON | | | ON | ON |
| EB | | | ON | | | | GE | GE |
| HEV | H-1 | | | | ON | ON | GE | ON |
| | H-2 | ON | | | | ON | GE | ON |
| | H-3 | | ON | | ON | | ON | GE |
| | H-4 | ON | ON | | | | ON | GE |
| | H-R | ON | | ON | | ON | GE | ON |

FIG. 18

|  |  | C1 | C2 | S | OWC | M/G1 | M/G2 |
|---|---|---|---|---|---|---|---|
| EV | E-1 |  |  |  | ON | — | ON |
|  | E-2 |  | ON |  |  | ON | ON |
|  | E-R |  | ON | ON |  | ON | ON |
| EB |  |  | ON |  |  | GE | GE |
| HEV | H-1 | ON |  |  | ON | GE | ON |
|  | H-2 | ON | ON |  | ON |  |  |
|  | H-3 | ON | ON |  |  | ON | GE |
|  | H-R | ON |  | ON |  | GE | ON |

DRIVE DEVICE FOR HYBRID ELECTRIC VEHICLE

BACKGROUND OF THE INVENTION

1. Field of the Invention

The present invention relates to a drive device for a hybrid electric vehicle that is equipped with an internal combustion engine and an electric motor to propel a hybrid electric vehicle.

2. Description of the Related Art

A conventional drive device for a hybrid electric vehicle of this kind is disclosed in U.S. Pat. No. 6,478,705. This conventional drive device for the hybrid electric vehicle has two motors/generators (hereinafter "motor/generator" is referred to as "M/G") and two planetary gear sets.

However, in the above known conventional drive device, there is a problem in that it cannot drive the hybrid electric vehicle by using both the motors at the same time to obtain large driving torque when it runs the hybrid electric vehicle as an electric vehicle.

It is, therefore, an object of the present invention to provide a drive device for a hybrid electric vehicle in which two M/Gs can drive at the same time to run the hybrid electric vehicle in an electric-vehicle driving mode, thereby capacities of the M/Gs being capable of being decreased.

SUMMARY OF THE INVENTION

According to a first aspect of the present invention there is provided a drive device for a hybrid electric vehicle including an input shaft, an output shaft, a power splitting gear set, a first motor/generator, a second motor/generator, a stationary part, and an input speed-change gear set.

The power splitting gear set includes a first planetary gear set having three rotatable elements of a first sun gear, a first ring gear and a first pinion carrier. The input shaft is connectable with the first ring gear. The output shaft is connected with the first pinion carrier. The first motor/generator is connected with the first sun gear. The second motor/generator is connectable with the output shaft and the first ring gear. The first ring gear is capable of being fixed to the stationary part. The input speed-change gear set is provided between the input shaft and the first ring gear to shift between a low-speed gear position and a high-speed gear position, and the input speed change gear set includes a first engaging element to transmit power at the low-speed gear position and a second engaging element to transmit the power at the high-speed gear position. The first ring gear is fixed to the stationary part when the first engaging element and the second engaging element are engaged at the same time.

Therefore, in the drive device of the present invention, the two M/Gs can drive the hybrid electric car at the same time. Accordingly, the capacities of M/Gs can be decreased, thereby decreasing its manufacturing costs, weight and size.

BRIEF DESCRIPTION OF THE DRAWINGS

The objects, features and advantages of the present invention will become apparent as the description proceeds when taken in conjunction with the accompanying drawings, in which:

FIG. 5 is an operation table of the drive device of the first embodiment;

FIG. 9 is an operation table of the drive device of the second embodiment;

FIG. 11 is an operation table of the drive device of the third embodiment;

FIG. 14 is an operation table of the drive device of the fifth embodiment;

FIG. 16 is an operation table of the drive device of the sixth embodiment;

FIG. 18 is an operation table of the drive device of the seventh embodiment.

DETAILED DESCRIPTION OF THE PREFERRED EMBODIMENTS

Figure 1:
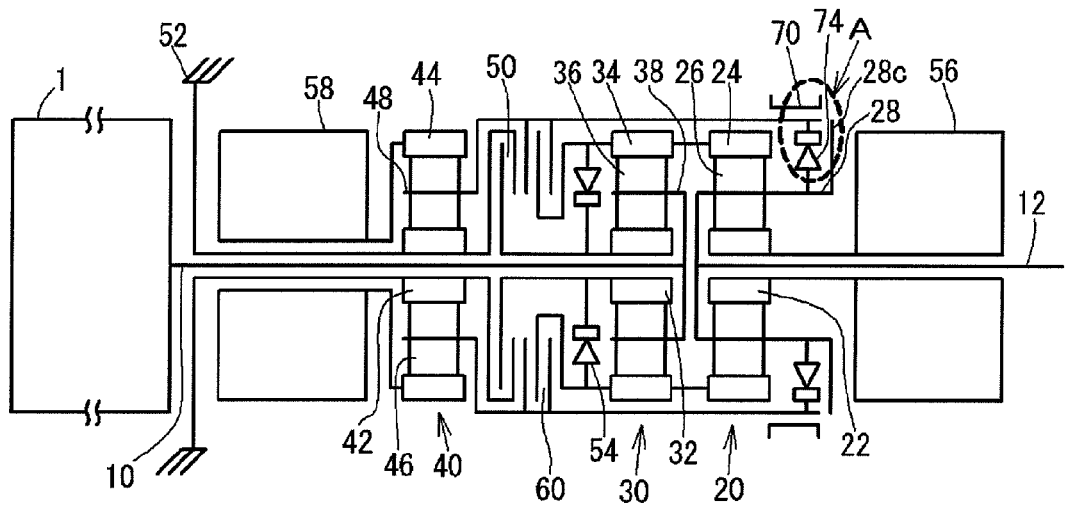
FIG. 1 is a view showing a power train of a drive device for a hybrid electric vehicle of a first embodiment according to the present invention.

Throughout the following detailed description, similar reference characters and numbers refer to similar elements in all figures of the drawings, and their descriptions are omitted for eliminating duplication.

Referring to FIG. 1, there is shown a first preferred embodiment of a drive device for a hybrid electric vehicle according to the present invention.

The drive device is used for driving the hybrid electric vehicle. The drive device has an input shaft 10 driven by an internal combustion engine 1, and an output shaft 12 arranged in coaxial with the input shaft 10 to drive wheels of the vehicle through a not-shown differential gear set.

A first planetary gear set 20, a second planetary gear set 30 and a third planetary gear set 40 are arranged between the input shaft 10 and the output shaft 12. The first to third planetary gear sets employ a single-pinion type planetary gear set, and accordingly their constructions are substantially the same.

The first planetary gear set 20 includes three rotatable elements of a first sun gear 22, a first ring gear 24, and a first pinion carrier 28. The first pinion carrier 28 rotatably supports a plurality of first pinions 26, each of which is engaged with the first sun gear 22 and the first ring gear 24.

The first planetary gear set 20 functions as a power splitting gear set of the present invention.

Similarly, the second planetary gear set 30 includes three rotatable elements of a second sun gear 32, a second ring gear 34, and a second pinion carrier 38. The second pinion carrier 38 rotatably supports a plurality of second pinions 36, each of which is engaged with the second sun gear 32 and the second ring gear 34.

The second planetary gear set 30 functions as an input speed-change gear set of the present invention.

Similarly, the third planetary gear set 40 includes three rotatable elements of a third sun gear 42, a third ring gear 44, and a third pinion carrier 48. The third pinion carrier 48 rotatably supports a plurality of third pinions 46, each of which is engaged with the third sun gear 42 and the third ring gear 44.

The third planetary gear set 40 functions as a speed-reduction gear set of the present invention.

A connection relationship of the rotatable members and others will be described.

The input shaft 10 is connected with the second pinion carrier 38.

The second sun gear 32 is fixable to a case (corresponding to a stationary part) 52 by a brake 50 and it is connectable with the second ring gear 34 through a first overrunning clutch 54 only in one rotational direction. Incidentally, the first overrunning clutch 54 functions as a first engagement element, and the brake 50 functions as a second engagement element.

The second ring gear 34 is connected with the first ring gear 24.

The first overrunning clutch 54 engages to prevent the second sun gear 32 from being rotated in the same direction as that of the engine 1. The first overrunning clutch 54 employs a well-known mechanical one using rollers or sprags which are arranged between an inner race and an outer race, while it may employ a multiple friction-plate type clutch actuated by pressurized oil.

Accordingly, when the second pinion carrier 38 connected with the input shaft 10 is driven by the engine 1 and the brake 50 is released to start the second sun gear 32 to rotate in the same rotational direction of that of the engine 1, the first overrunning clutch 54 engages, so that the second sun gear 32 and the first ring gear 24 are coupled to rotate the second planetary gear set 30 as one unit.

On the contrary, when the second ring gear 34 starts to rotate in the rotational direction opposite to that of the engine 1, the first overrunning clutch 54 engages, so that the second ring gear 34 and the second sun gear 32 are coupled to rotate the second planetary gear set 30 as one unit.

Incidentally, the first overrunning clutch 54 may be arranged between the second pinion carrier 38 and the second sun gear 32, or between the second pinion carrier 38 and the second sun gear 32 instead of between the second ring gear 34 and the second sun gear 32. In every case, the same function described above can be obtained.

The first sun gear 22 is connected with a first M/G 56.

The first pinion carrier 28 is connected with the output shaft 12. The first carrier 28 can be driven by a second M/G 58 and it can drive the second M/G 58 when the first sun gear 28 is connected with the third pinion carrier 48.

The third sun gear 42 is fixed to the case 52, and the third ring gear 44 is connected with the second M/G 58.

Accordingly, the output torque of the second M/G 58 is always outputted through the third pinion carrier 48 at a reduced speed ratio obtained at the third planetary gear set 40. On the contrary, the second M/G 58 is driven at an overdrive speed ratio by the third planetary gear set 40 to generate electric power where the torque is inputted to the third pinion carrier 48.

The third pinion carrier 48 and the first pinion carrier 28 are connectable only in one rotational direction by the engagement of a second overrunning clutch 74, and they are also connectable in any rotational direction by the engagement of a sleeve 70 and a dog clutch 28c.

The sleeve 70 and the dog clutch 28c function as a mechanically connectable mechanism of the present invention.

The sleeve 70 is capable of being moved by a not-shown fork in an axial direction.

Accordingly, in a case where the torque of the second M/G 58 dives the output shaft 12 at a reduced speed ratio through the third planetary set 40, it drives through the second overrunning clutch 74 when the vehicle runs in a forward direction, while it drives through the sleeve 70 and the dog clutch 28c that are engaged with each other when the vehicle runs in a backward direction.

Herein, the operation to release the engagement of the sleeve 70 and the dog clutch 28c will be described with reference to the drawings of FIGS. 2 to 4.

In the explanation below, a positive rotational direction corresponds to the same rotational direction as that of the engine 1, and a negative (or reverse) rotational speed corresponds to the rotational direction opposite to the of the engine 1.

In general, in a case where an overrunning clutch and a mechanically engageable mechanism are provided parallel to each other, large force to release the mechanical engagement is necessary and a shock sometimes occurs at the instance of disengagement thereof.

Specifically, when torque is transmitted through an overrunning clutch (the second overrunning clutch 74 in the first embodiment) between two members (the third pinion carrier 48 and the first pinion carrier 28 in the first embodiment) in one rotational direction and it is transmitted therebetween through the mechanically engageable mechanism (the sleeve 70 and the dog clutch 28c in the first embodiment) in the other rotational direction, the torque remains between the overrunning clutch and the mechanically engageable mechanism although no torque acts between the members even after the torque is transmitted through the mechanically engageable mechanism. This causes the shock because the mechanical engagement is needed to be released against the residual torque.

A construction and its operation to easily release the engagement will be described below.

Figure 2:
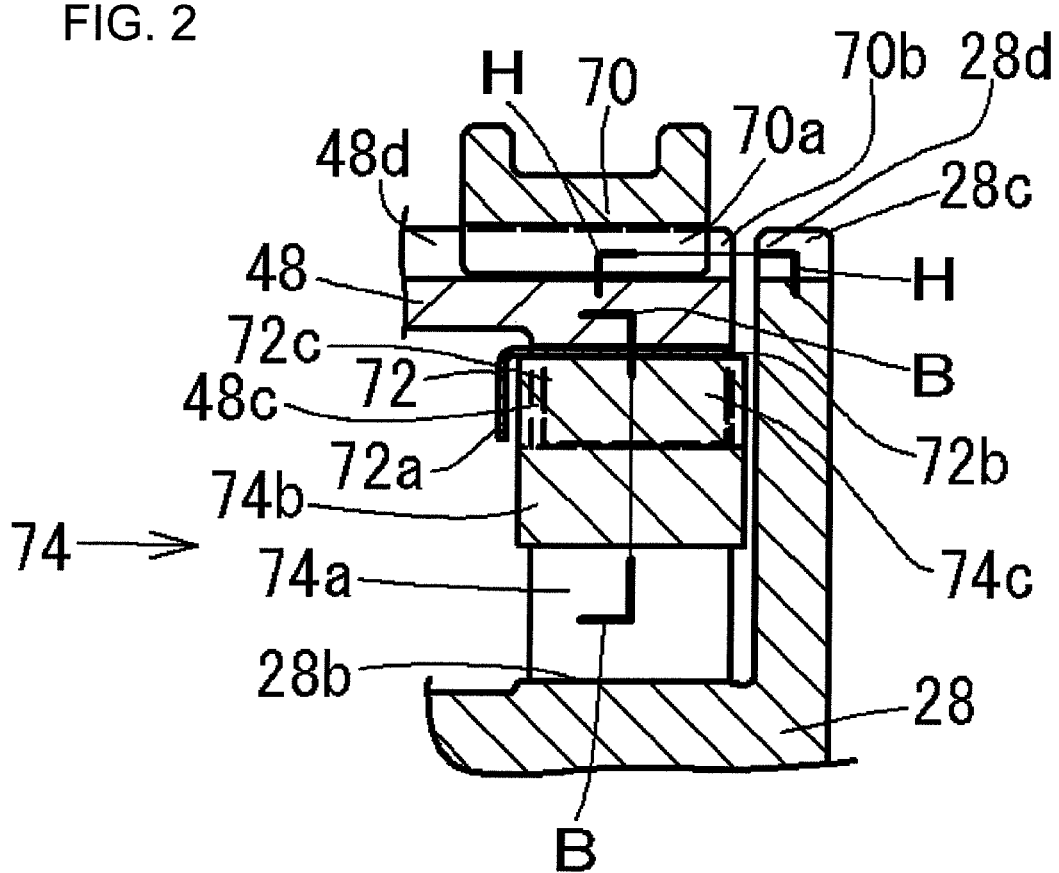
FIG. 2 is an enlarged cross-sectional view of a part indicated by "A" in FIG. 1.

In FIG. 2, an outer circumferential surface 28b and the dug clutch 28c are formed on the first pinion carrier 28, where the outer circumferential surface 28b is contacted with sprags 74 of the second overrunning clutch 74 and the dug clutch 28c is engaged with splines 70a of the sleeve 70.

The splines 70a and 28c are engaged by the axial movement of the sleeve 70 toward the right side from the position indicated in FIG. 2. The edges 70b, 28d of the splines 70a, 28c are slanted as shown in FIG. 4.

The second overrunning clutch 74 has a plurality of sprags 74a between the outer circumferential surface 28b and the outer ring 74b. The sprags 74a can exert wedge action. The clutch 74 allows the first pinion carrier 28 to rotate in the positive rotational direction, while the sprags 74a prevent it from rotating in the negative rotational direction.

Specifically, when the sprags 74a transmit the torque when the third pinion carrier 48 drives the first pinion carrier 28 in the positive rotational direction, while the wedge action of the sprags 74a does not exert and they are free from each other when the first pinion carrier 28 rotes in the positive rotational direction at the speed faster than that of the third pinion carrier 48.

Figure 3:
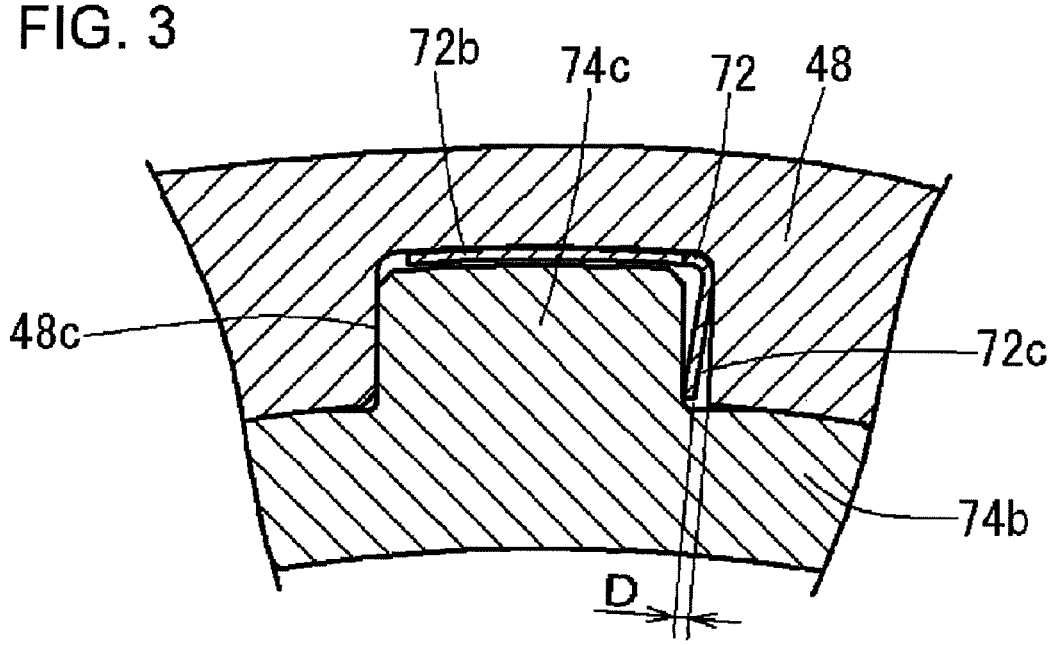
FIG. 3 is an enlarged cross-sectional view taken along a line B-B in FIG. 2.

As shown in FIGS. 2 and 3, spline teeth 74c formed on the outer side of the outer ring 74b are engaged with spline grooves 48c formed on the third pinion carrier 48. A spring 72 is located between the spline teeth 74c and the spline grooves 48c, and a rotational play is provided therebetween, where the rotational play has a play amount D indicated in FIG. 3.

The spring 72 employs a plate spring having a ring portion 72a as shown in FIG. 2, being formed corresponding to the outer ring 74b. Its outer circumferential portion 72b is inserted from the in-radial-directional outermost portion between a clearance formed between the spline grooves 52c and the spline teeth 74c. A lingual portion 72c is bent inwardly in the radial direction from the outer circumferential portion 72b as shown in FIG. 3 to press the spline teeth 74c toward side walls of the spline grooves 52c in the rotational direction with the rotational play D.

The lingual portion 72c elastically presses the spline teeth 74c to move toward the left side (in a counterclockwise direction) in FIG. 3. The lingual portion 72c is elastically deformed to remove the rotational play D when the second overrunning clutch 74 drives the first carrier 28.

Figure 4:
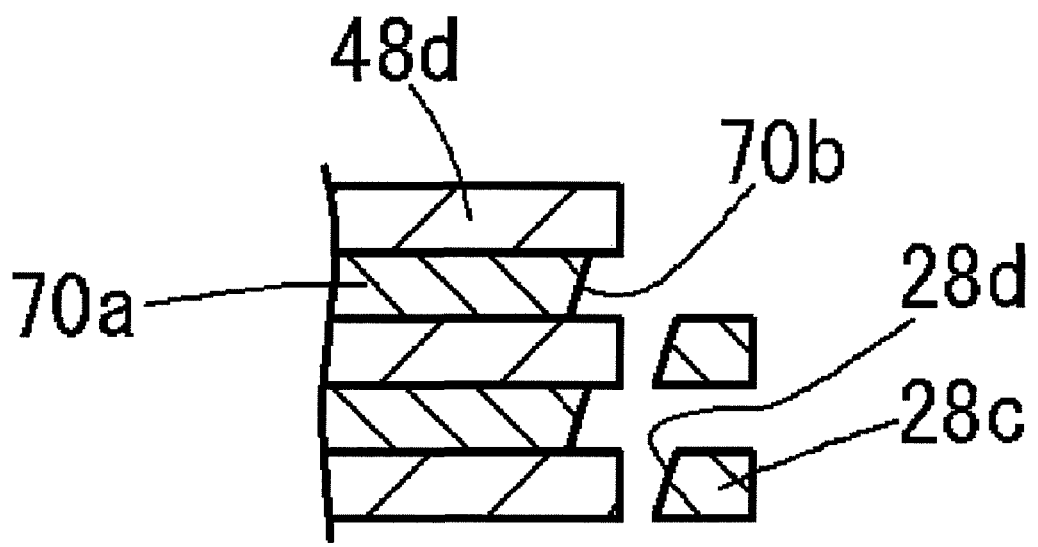
FIG. 4 is an enlarged cross-sectional view taken along a line H-H in FIG. 2.

When the splines 70a and the splines 28c are engaged with each other as shown in FIG. 4, some amount of the rotational play exists between the first carrier 28 and the third carrier 48. Therefore, as soon as they are engaged, the first carrier 28 and the third carrier 48 slightly rotate relative to each other when they are disengaged. This rotational amount is defined as "G" which corresponds to the rotational amount D in FIG. 3.

In a case where torque acts between the first carrier 28 and the third carrier 48 in the positive rotational direction in a state where the splines 70a and 28c are engaged, the second overrunning clutch 74 transmits the torque, while the wedge action does not exert when the torque acts in the reverse direction.

In order to release the engagement of the sleeve 70 and the dog clutch 28c after the torque acts in the positive rotational direction and the second overrunning clutch 74 transmits the torque through the wedge action, the disengagement thereof can be smoothly executed when the first carrier 28 rotates in the positive rotational direction in the maximum rotational amount G.

Accordingly, when the rotational amount D is set larger than the rotational amount G, it is enough for the release force to have the elastic force overcoming that of the lingual portion 72c in order to release the engagement of the sleeve 70 and the dog clutch 28c. In this case, no shock occurs due to the disengagement.

The operation of the drive device of the first embodiment will be described with reference to an operation table shown in FIG. 5.

In the operation table in FIG. 5, running modes and driving modes are assigned in the columns of the table, while engaging elements such as a brake, a clutch and M/Gs are assigned in the rows of the table.

In the table the clutch 60 is denoted as "C", the brake 50 is denoted as "B", the sleeve 70 is denoted as "S", the first overrunning clutch 54 is denoted as "OWC1", the second overrunning clutch 74 is denoted as "OWC2", the first M/C 56 is denoted as "MG1", and the second M/G 58 is denoted as "M/G2".

In the table, "ON" indicates the engagement of the corresponding engaging elements or the drive of the corresponding first or second M/G 56, 58, and "GE" indicates the generation of electric power by the corresponding first or second M/G 56, 58. In addition, "-" indicates a state where the corresponding M/G is stoppable.

Incidentally, the drive device shown in FIG. 1 includes an oil pump, a battery, various sensors, a controller, actuators, and others, as required. The operations below are carried out according to the commands outputted from the controller.

Further, the gear ratios (the teeth number of the sun gear/the teeth number of the ring gear) of the first to third planetary gear sets 20, 30, 40 are respectively set to be $\alpha 1$, $\alpha 2$, $\alpha 3$.

Then, the speed ratio (the rotational speed of the third ring gear 44/the rotational speed of the third carrier 48) between the third ring gear 44 and the third carrier 48 is $(1+\alpha 3)$. Hereinafter, $(1+\alpha 3)$ is referred to as "I".

First, an EV running mode will be described, where the EV running mode is a running mode where the vehicle runs as an electric vehicle (EV) only by using the electric power stored in the battery.

The EV running mode of the first embodiment has six different running modes: an HH mode for executing a hill-hold operation, E-1 to E4 modes for different forward running, and an E-R mode for backward running.

The HH mode can be established by engaging the clutch 60 and applying the brake 50. The output shaft 12 is prevented from rotating in the reverse rotational direction by automatically engagement of the first and second over running clutches 54 and 74. Consequently, the second ring gear 34 and the first ring gear 24 cannot rotate in the reverse direction.

Incidentally, the brake 50 and the first overrunning clutch 54 correspond to a mechanism for preventing the first ring gear 24 from rotating in the reverse direction.

In addition, the clutch 60 and the second overrunning clutch 74 are engaged to prevent the output shaft 12 from rotating in the reverse direction.

Consequently, the vehicle is prevented from moving backward in the HH mode when the vehicle stops at a red light on a rising slope without operating a brake pedal.

In the next E-1 mode, the first M/G 56 drives in the positive rotational direction with the same engagement state as that in the HH mode. Then, the output shaft 12 is driven at a reduced speed ratio. This enables the second overrunning clutch 74 to be automatically released, so that the vehicle can run in the forward direction.

The output torque $T_{out}$ in this case is $T1(1+\alpha 1)/\alpha 1$, where the torque of the first M/G 56 is T1. At this time, the second M/G 58 can be stopped.

Incidentally, the clutch 60 is kept being engaged in this mode, but it does not transmit any power.

The difference between the HH mode and the E-1 mode is only whether the first M/G 56 drives or not, while the clutch 60 is engaged and the brake 50 is applied in the both modes. Therefore, the vehicle runs forward when the first M/G 56 drives, while the vehicle stops due to the hill-hold function when the M/G 56 stops. These modes are suitable for running where the vehicle repeatedly changes starting and stopping.

To establish the E-2 mode, the clutch 60 is disengaged, the brake 50 is released and only the second M/G 58 drives the output shaft 12 through the third planetary gear set 40 at a reduced speed ratio. In this state, the third carrier 48 drives the output shaft 12 through the second overrunning clutch 74. In this case, the output torque $T_{out}$ is T2·I, where the torque of the second M/G 58 is T2. At this time, the first overrunning clutch 54 is automatically released, so that the first M/G 56 can be stopped.

To establish the E-3 mode, the brake 50 is applied and the second overrunning clutch 74 is automatically engaged. In this case, the first overrunning clutch 54 is also automatically engaged, so that the vehicle runs in the mode combining the E-1 mode and the E-2 mode. The output torque $T_{out}$ in this mode is $T1(1+\alpha1)/\alpha1+T2\cdot I$.

To establish the E-4 mode, the brake 50 is released and the clutch 60 is engaged. Then, the second M/G 58 is connected with the first ring gear 24 through the third planetary gear set 40, and accordingly the output shaft 12 is driven by the both of the first M/G 56 and the second M/G 58. The output torque $T_{out}$ in this mode is $T1+T2\cdot I$.

As understood from the above description, the E-1 to E-3 modes are suitable for the forward running at low speed and middle speed, and the E-4 mode is suitable for the forward running at high speed. Especially, the E-1 to E-3 modes can be optimally shifted therebetween according to running load of the vehicle.

In addition, I case where the capacities of the first M/G 56 and the second M/G 58 are set different from each other, the three different capacities of M/Gs can be obtained at the low gear ratios in the E-1 to E-3 modes by selectively using one of the both M/Gs or the both M/Gs.

The E-R mode will be described.

To establish the E-R mode, the sleeve 70 is engaged with the dog clutch 28c. The third pinion carrier 48 and the first pinion carrier 28 are connected with each other, so that the second M/G 58 can drive the vehicle in the backward direction. The torque $T_{out}$ of the output shaft 12 in the E-R mode has the same value as that in the E-2 mode, although their rotational directions are different.

An EB mode will be described. The EB mode is used for coasting during the forward running in a state where the both M/Gs 56 and 58 do not drive the vehicle and the engine 1 is stopped, or in a state where the M/Gs 56 and 58 generate the electric power and the engine 1 is stopped.

In the EB mode, the brake 50 is released and the clutch 60 is engaged similarly to the operation in the E-4 mode, and the both M/Gs 56 and the 58 generate the electric power. The torque $T_{out}$ of the output shaft 12 in the EB mode has the same value as that in the E-4 mode, although the operations of the M/Gs 56 and 58 are different between in the E-4 mode and in the EB mode.

The EB mode covers a range from the low speed to the high speed, providing high degrees of freedom of controlling brake force.

The electric power generated in the EB mode is stored in a battery to be supplied for next acceleration. This energy regeneration can decrease fuel consumption of the vehicle.

An HEV mode will be described.

The HEV mode is used for driving the vehicle by using the engine 1 and at least one of the first and second M/Gs 56 and 58. The running in the HEV mode is suitable for normal running when the charge amount of the battery is low, acceleration and hill-climbing when large driving force is needed compared to in the EV mode, and high-speed running.

How to start the engine 1 will be described.

To start the engine 1 when the vehicle stops or it runs at low speed, the brake 50 is applied and the first M/G 56 is supplied with the electric power to drive in the reverse rotational direction. This rotates the first ring gear 24 and the second ring gear 34 in the positive rotational direction under the operation of the first planetary gear set 20, and the second pinion carrier 36 is driven at the reduced speed ratio under the operation of the second planetary gear set 30 to drive the engine 1 in the positive rotational direction. At this time, the fuel is supplied to engine 1 I and its spark plugs are ignited to start the engine 1.

During starting the engine 1, the torque in the reverse rotational direction acts on the first pinion carrier 28 due to the driving torque of the first M/G 56. This torque acts to move the vehicle backward, and accordingly it is needed to cancel the torque to prevent the vehicle from moving backward due to the torque. Therefore, the electric power is supplied to the second M/G 58, so that the second M/G 58 outputs its torque in the positive rotational direction to cancel the torque of the first M/G 56.

On the other hand, while the second M/G 58 drives the vehicle forward in the E-2 mode, the electric power is supplied to the first M/G 56, so that the first M/G 56 outputs its torque to start the engine 1.

To start the engine 1 when the vehicle runs at the speed higher than a predetermined speed, the first M/G 56 is rotated together with the second ring gear 34 in the positive rotational direction to generate the electric power. Accordingly, the brake 50 is applied to act its braking force on the second sun gear 32, so that the engine 1 rotates at the reduced speed ratio. In this operation, the braking force of the brake 50 may be not so large to stop the second sun gear 32.

After the engine 1 starts, the running mode is shifted to one of an H-1 mode (a low-speed HEV mode) and an H-2 mode (a middle-speed HEV mode) according to a vehicle speed and so on.

In the H-1 mode, the first overrunning clutch 54 and the second overrunning clutch 74 are engaged, so that the ring gear 24 is driven in a state where the secondary planetary gear set 30 and the input shaft 10 rotate together as one unit because of the engagement of the first overrunning clutch 54 when the engine 1 drives the input shaft 10 in the positive rotational direction.

The first ring gear 24 drives the first pinion carrier 28, which is connected with the output shaft 12, at the reduced speed ratio, and its reaction torque rotates the first M/G 56 in the reverse rotational direction to generate the electric power. In other words, the torque outputted from the engine 1 is divided into the torque mechanically driving the first pinion carrier 28 at the reduced speed ratio and the torque rotating the first M/G 56 to generate the electric power.

The electric power generated by the first M/G 56 is supplied to the second M/G 58 to drive the output shaft 12 at a reduced speed ratio through the third planetary gear set 40 similarly to the operation in the E-2 mode.

In this mode, the torque $T_{out}$ of the output shaft 12 is $T1(1+\alpha1)/\alpha1+T2\cdot I$, which is replaced by $T_{out}=T_e(1+\alpha1)+T2\cdot I$, where $T_e$ is the torque outputted from the engine 1.

As the vehicle speed becomes higher in the H-1 mode, the generating efficiency becomes lower because the first M/G 56 becomes to rotate at very low speed together with the first sun gear 22. Therefore, the running mode is shifted to the H-2 mode before the generating efficiency becomes low.

To establish the H-2 mode, the brake 50 is applied. This releases the first overrunning clutch 54, so that the first ring gear 24 becomes to be driven at an overdrive speed ratio from the state where it is rotated at the same speed as that of the input shaft 10 in the H-1 mode.

As a result, the rotational speed of the first sun gear 22 and the first M/G 56 goes up, assuming that the rotational speed of the output shaft 12 is maintained before and after shifting the modes, thereby its generating efficiency and power transmission efficiency are improved.

In this mode, the torque $T_{out}$ of the output shaft 12 is $T1(1+\alpha1)/\alpha1+T2\cdot I$, which is replaced by $T_{out}=T_e(1+\alpha1)/(1\alpha2)++T2\cdot I$, where $T_e$ is the torque outputted from the engine 1.

In an H-3 mode, the brake 50 is released and the clutch 60 is engaged. The input shaft 10 is rotated by the engine 1 in the positive rotational direction, so that the second M/G 58 and the first ring gear 24 are driven because the second planetary gear set 30 and the input shaft 10 rotate together as one unit due to the operation of the first overrunning clutch 54. In addition, the first planetary gear set 20 rotates as one unit because the third carrier 48 and the first carrier 28 are connected with each other under the operation of the second overrunning clutch 574.

That is, the input shaft 10 and the output shaft 12 are mechanically connected only in the forward drive direction, and the first M/G 56 and the second M/G 58 do not need to drive or generate although they continue to rotate.

To establish an H-4 mode, the second M/G 58 generates the electric power and this power is supplied to the first M/G 56 to drive the vehicle in the running state in the H-3 mode.

In this mode, the torque $T_e$ outputted from the engine 1 is divided into the torque driving the second M/G 58 and the torque driving the first ring gear 24. Thus, the second M/G 58 generates the electric power, which is supplied to the first M/G 56 to drive the first sun gear 22.

As a result, the output shaft 12 is driven by the first ring gear 24 and the first M/G 56. This provides an overdrive speed ratio where the rotational speed of the output shaft 12 is higher than that of the input shaft 10.

In this mode, the torque $T_{out}$ of the output shaft 12 is $T_e+T1-T2 \cdot I$, which is equal to $T1(1+\alpha1)/\alpha1$.

Incidentally, the torque driving the first ring gear 24, which is divided from the torque $T_e$ outputted from the engine 1, is $T1/\alpha1$, and it acts as reaction torque of the torque of which the first M/G 56 drives the first sun gear 22.

When the vehicle speed goes up in the H-4 mode, the rotational speed of the first M/G 56 also goes up toward the range where the driving efficiency of the first M/G 56 is low. Accordingly, the mode is shifted to an H-5 mode from the H-4 mode before the driving efficiency becomes low.

In the H-5 mode, the clutch 60 is engaged and the brake 50 is applied.

As a result, the secondary planetary gear set 30 increases the rotational speed of the input shaft 10. This causes the second M/G 58 and the first ring gear 24 to rotate at the rotational speed $(1+\alpha2)$ times as that of the input shaft 10.

As the third pinion carrier 48 and the first pinion carrier 28 are connected with each other under the operation of the second overrunning clutch 74, the first planetary gear set 20 rotates as one unit, the output shaft 12 rotates at the overdrive speed $(1+\alpha2)$ times as that of the input shaft 10 only in the forward drive direction, being mechanically driven. Although the first and second M/Gs continue to rotate, they are not needed to drive or generate.

The torque $T_{out}$ of the output shaft 12 is $T_e/(1+\alpha2)$.

To establish an H-6 mode, the second M/G 58 generates the electric power and this power is supplied to the first M/G 36 to drive in the H-5 mode.

I the H-6 mode, the rotational speed of the second M/G 58 goes up, deviating from the range in the H-4 mode where the rotational speed of the second sun gear 32 and the second M/G 58 goes down and the driving efficiency of the second M/G 28 is low. This brings the generating efficiency and the power transmission efficiency to be improved.

Thus, the second M/G 58 generates the electric power, which is supplied to the first M/G 56 to drive the first sun gear 22 similarly to under the operation in the H-4 mode. Accordingly, the output shaft 12 is driven by the first ring gear 24 and the first M/G 56.

In this mode, the torque $T_{out}$ of the output shaft 12 is $T_e/(1+\alpha2)+T1-T2(1+\alpha3)$, which is equal to $T1(1+\alpha1)/\alpha1$.

The rotational speed ratio in the H-6 mode becomes higher than that $(1/(1+\alpha1))$ in the H-5 mode.

In the H-1 to E-6 modes except the H-3 mode and the H-5 mode where the vehicle is driven only by the engine 1, the first planetary gear set 20 mechanically transmits a part of the engine torque, and the rest thereof is changed to the electric power so that the M/G drives the output shaft 12. Accordingly, the power transmission ratio of mechanical transmission to electrical transmission becomes large. This improves the power transmission efficiency.

An H-R mode will be described.

To establish the H-R mode where the vehicle is driven backward, the sleeve 70 is engaged with the dog clutch 28c, and the brake 50 is applied to fix the second sun gear 32 on the case 52 similarly to the operation in the H-2 mode, except that the rotational direction of the second M/G 58 is opposite to that in the H-2 mode.

In this mode, the torque $T_{out}$ of the output shaft 12 is $T_e(1+\alpha1)/(1+\alpha2)-T2 \cdot I$, which is larger than that in the H-2 mode.

The mechanically transmitting torque of the engine torque always acts in the forward direction, and accordingly the larger backward driving torque can be obtained by decreasing the ratio of the mechanically transmitting torque. The H-R mode is suitable in a case where the charge amount of the battery is small.

In the above-described description on vehicle running in the HEV mode, one of the first M/G 56 and the second M/G 58 generates the electric power and this power is supplied to the other thereof. The invention is not limited to this operation. A part of the electric power may be charged in the battery, and the other M/G may be supplied with the generated power and the power from the battery to drive the vehicle.

As described above, the drive device of the first embodiment can drive the vehicle by using the both of the first and second M/Gs 56 and 58 at the same time. Therefore, the motor capacities of the first and second M/Gs 56 and 58 can be set smaller than that in the case where only one M/G is used, thereby decreasing manufacturing cost, weight and size, including those of an inverter.

In the first embodiment, the vehicle can be driven by selectively using one of the first and M/Gs 56 and 58 or the both of them. Therefore, its drive control can be optimally selected according to a vehicle load. Especially, in the E-1 mode and the E-2 mode where the vehicle runs at low speed, one of the first and M/Gs 56 and 58 and the other is stopped. This decreases the energy consumption due to a rotational movement of the other dragged by the one.

In addition, the drive device of the first embodiment has the hill-hold function in the HH mode. The clutch 60 is engaged and the brake 50 is applied in the HH mode and the E-1 mode, which is useful when the vehicle repeatedly starts and stops on a rising slope.

In the drive device of the first embodiment, the clutch 60 is engaged and the first and second M/Gs 56 and 58 generate to apply braking force to the vehicle in the EB mode, while the both of the first and second M/Gs 56 and 58 can be stopped when the clutch 60 is disengaged.

Therefore, the drive device of the first embodiment is suitable for a plug-in hybrid electric vehicle, which runs short distance in an urban area mainly as an electric vehicle, while it runs by the engine 1 when the charge amount of the battery is small.

Figure 6:
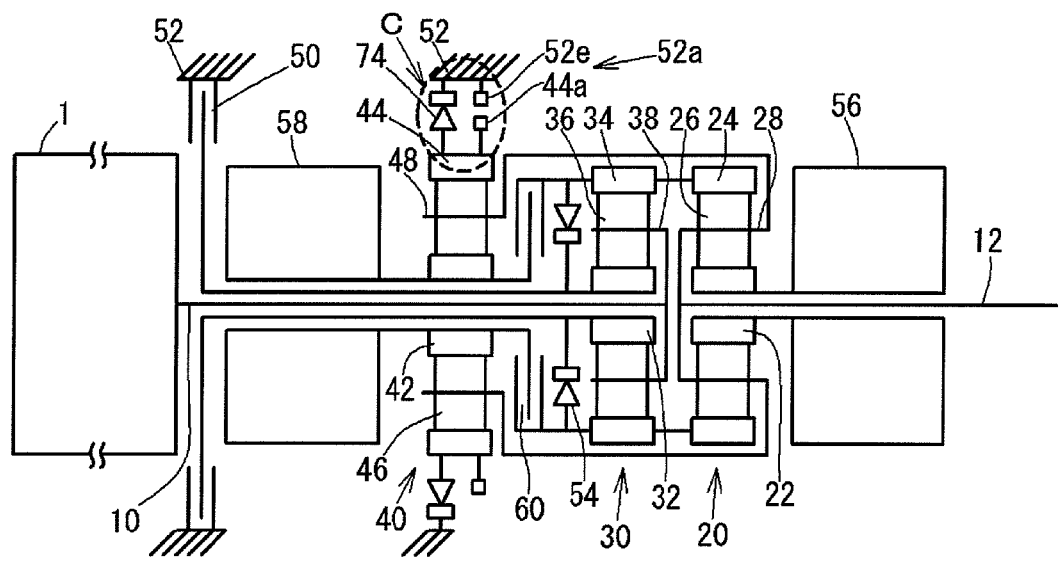
FIG. 6 is a view showing a power train of a drive device for a hybrid electric vehicle of a second embodiment according to the present invention.

Next, a second embodiment according to the present invention will be described. FIG. 6 shows a power train of a drive device for a hybrid electric vehicle of the second embodiment.

The second embodiment is different from the first embodiment in a connection relationship of a third planetary gear set 40.

A second M/G 58 is connected with a third sun gear 42 and it is connectable with a second ring gear 34 and a first ring gear 24 through a clutch 60. A third pinion carrier 48 is always connected with an output shaft 12. A third ring gear 44 is stoppable in one rotational direction on a case 52 through a second overrunning clutch 74, and it is also stoppable on the case 52 in any rotational direction through a mechanically engageable mechanism arranged parallel to the second overrunning clutch 74.

Similarly to the first embodiment, a brake 50 and a first overrunning clutch 54 can prevent the first ring gear 24 from rotating in a reverse direction.

The other parts are similar to those of the first embodiment, and their explanation is omitted.

Figure 7:
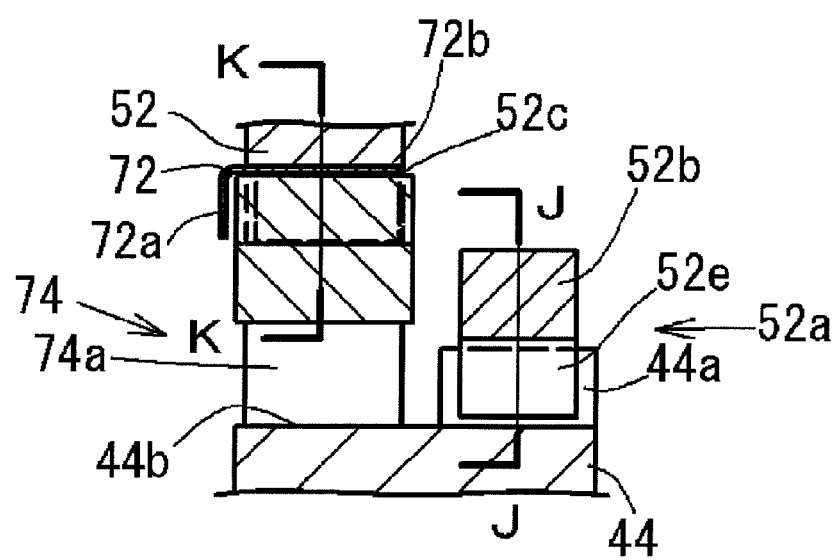
FIG. 7 is an enlarged cross-sectional view of a part indicated by "C" in FIG. 6.
Figure 8:
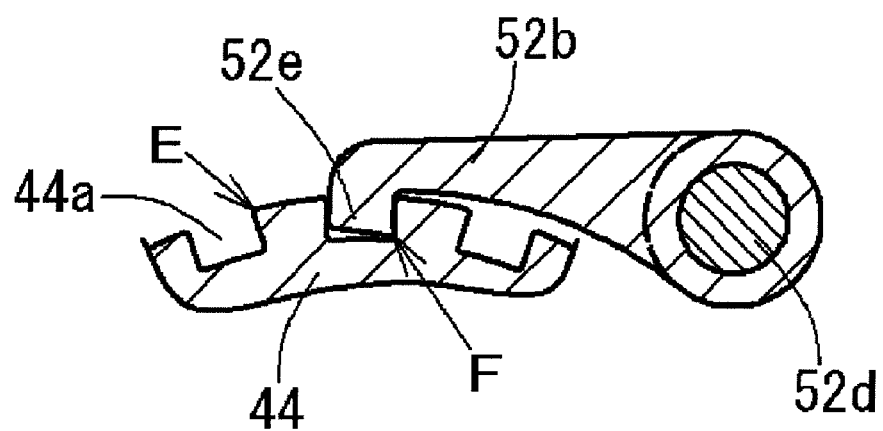
FIG. 8 is an enlarged cross-sectional view taken along a line J-J in FIG. 7.

FIG. 7 shows an enlarged cross-sectional view of a part indicated by C in FIG. 9, and FIG. 8 is an enlarged cross-sectional view taken along a line J-J in FIG. 7. A cross sectional view taken along a line K-K is similar to that of FIG. 3, and its drawing is omitted.

As shown in FIG. 7, a plurality of dog-teeth grooves 44a and an inner-race outer-circumferential surface 44b are formed on an outer circumferential surface of the third ring gear 44. The dog-teeth grove 33a can be engaged with a first fixing arm 52 of a first fixing device 52a, and the inner-race outer-circumferential surface 44b is connected with sprags of the second overrunning clutch 74. FIG. 7 shows an engagement state where a tooth 52e of the first fixing arm 52b is engaged with one of the dog teeth grooves 44a as shown in FIG. 8. A play D is provided similarly to that shown in FIG. 3.

In the fixing device 52a, the first fixing arm 52b is swingably fitted around a pin 52d on the case 52. Accordingly, when the first fixing arm 52b swings in a clockwise direction from the position shown in FIG. 8, the first fixing arm 52b is disengaged from the dog-teeth groove 44a.

FIG. 9 shows an operation table of the drive device of the second embodiment. In the operation table, the first fixing device 52a is indicated by "L". That is, "S" in the operation table shown in FIG. 5 is replaced by "L" in FIG. 9. Therefore, the operation of the second embodiment is similar to that of the first embodiment.

Only the speed ratios and the torque $T_{out}$ of the output shaft 11 are different from those of the first embodiment because the connection relationship of the third planetary gear set 40 is different from that of the first embodiment.

Hereinafter, the formula $(1+\alpha 3)/\alpha 3$ is expressed by "J".

In an E-2 mode, the torque $T_{out}=T2 \cdot J$. In an E-3 mode, $T_{out}=T1(1+\alpha 1)/\alpha 1+T2 \cdot J$. In an E-R mode, the torque $T_{out}$ is equal to that in the E-2 mode except its rotational direction.

In an H-1 mode, $T_{out}=T1(1+\alpha 1)/\alpha 1+T2 \cdot J=T_e(1+\alpha 1)+T2 \cdot J$.

In an H-2 mode, $T_{out}=T1(1+\alpha 1)/\alpha 1+T2 \cdot J=T_e(1+\alpha 1)/(1+\alpha 2)+T2 \cdot J$.

In an H-3 mode, a mechanical connection in a forward drive direction is provided with a speed ratio (the rotational speed of the input shaft 10/the rotational speed of the out shaft 12) of J.

In an H-4 mode, $T_{out}=T(1+\alpha 1)/\alpha 1=T_e+T1-T2$. In this mode the second M/G 58 is driven through the second planetary gear set 30 at an overdrive speed $(1+\alpha 2)$ times of that of input shaft 10.

In an H-5 mode, a mechanical connection in a forward drive direction is provided with a speed ratio of $J(1+\alpha 2)$.

In an H-6 mode, $T_{out}=T1(1+\alpha 1)/\alpha 1=T_e/(1+\alpha 2)+T1-T2$.

In an H-R mode, this mode is similar to the H-2 mode except the rotational direction and the torque $T_{out}=T_e(1+\alpha 1)/(1+\alpha 2)-T2 \cdot J$.

The second embodiment has the following advantage in addition to those of the first embodiment.

The connection relationship of the third planetary embodiment 40, which functions as a reduction gear set, is set as described above, the reduction speed ratio between the second M/G 58 and the output shaft 12 can be set wider. Therefore, the torque when the vehicle starts can be set large.

Next, a third embodiment of the present invention will be described.

Figure 10:
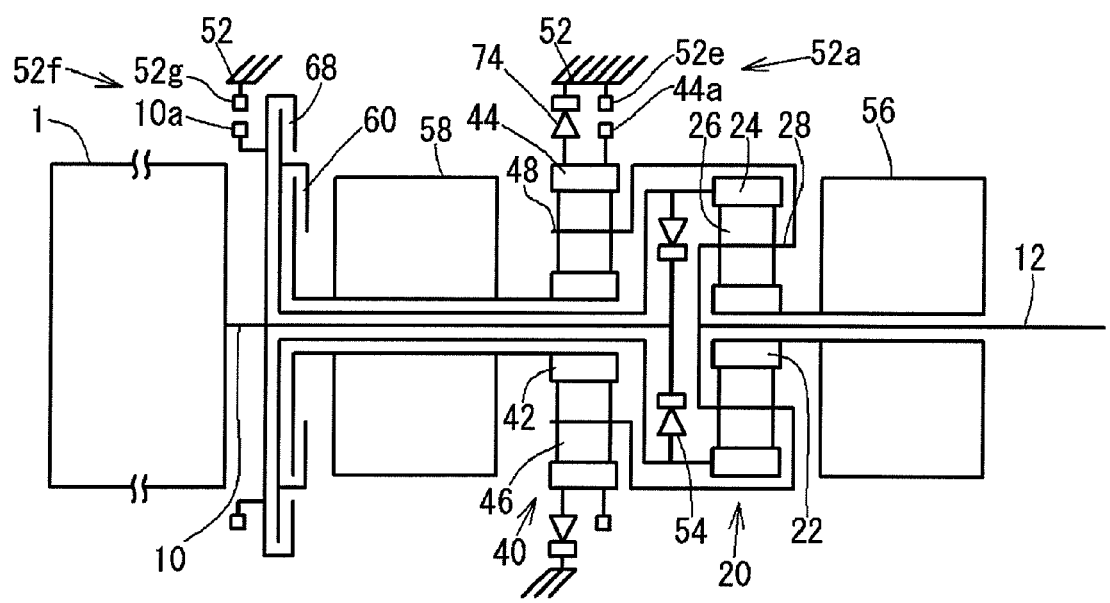
FIG. 10 is a power train of a drive device for a hybrid electric vehicle of a third embodiment according to the present invention.

FIG. 10 shows a power train of a drive device for a hybrid electric vehicle of the third embodiment.

The third embodiment is different from the first embodiment in that the second planetary gear set 30 is removed and a connection relationship of a third planetary gear set 40 is similar to that of the second embodiment.

An input shaft 10 is connectable with a first ring gear 24 in one rotational direction (in a rotational direction of an engine 1) through a first overrunning clutch 54, and it is connectable with the first ring gear 24 in any rotational direction through a second clutch 68.

A first clutch 60 can connect the first ring gear 24 and a second M/G 58 with each other.

A second fixing device 52f is provided to fix the input shaft 10 on a case 52. Specifically, the input shaft 10 has dog teeth 10a, which is engageable with a second fixing arm 52g so that the input shaft 10 can be fixed.

The second fixing device 52f is constructed similarly to the first fixing device 52a, but the dog teeth 10a may be formed on an outer peripheral surface of a flywheel provided with an engine 1.

Accordingly, the first ring gear 24 can be prevented from rotating in the reverse rotational direction when the second fixing device 52f engages and the first overrunning clutch 54 engages.

The second fixing device 52f and the first overrunning clutch 54 correspond to a reverse-rotation preventing mechanism of the first ring gear 24.

The other connection relationship is the similar to that of the first embodiment.

FIG. 11 shows an operation table of the drive device of the third embodiment.

In the table, the first fixing device 52a is indicated as "L1", and the second fixing device 52f is indicated as "L2". A mark "HD" in the table indicates a state where some electric power is supplied to the first M/G 56 so that the first M/G 56 continues to stop.

To establish an HH mode, the first and second clutches 60 and 68 are engaged and the second fixing device 52f is engaged to fix the input shaft 10. Then the third sun gear 42 is fixed on the case 52, and the output shaft 12 is prevented from rotating in the reverse rotational direction due to the automatic engagement of the second overrunning clutch 74.

To establish an E-1 mode, this connection relationship is the same as that in the HH node, so that the first ring gear 24 is fixed on the case 5. The first M/G 56 is supplied with the electric power to drive the vehicle in the positive rotational direction. The output shaft 12 is driven at a reduced speed ratio. At this time, the second overrunning clutch 74 is automatically released, and accordingly the vehicle runs forward.

In this mode, the torque $T_{out}$ of the output shaft 12 has the same value as that of the first embodiment, and the second M/G can be stopped similarly to that of the first embodiment.

Although the first clutch 60 continues to be engaged, it does not affect power transmission.

Therefore, similarly to the first embodiment, the vehicle runs forward when the first M/G 56 drives, while the vehicle can exert the hill-hold function when the first M/G 56 stops.

An E-2 mode and an E-3 mode is the same as the E-2 mode and the E-4 mode of the second embodiment.

Although an operation below is not shown in the table shown in FIG. 11, the drive device of the third embodiment may have an additional mode similar to the E-3 mode of the first embodiment and the second embodiment where the first and second M/Gs 56 and 58 drives at a reduced speed ratio, in a state where the second fixing device 52*f* is engaged.

To establish an E-R mode, the first and second fixing devices 52*a* and 52*f* are engaged to fix the first ring gear 24 and the third ring gear 44 on the case 52. This enables the both of the first and second M/Gs 56 and 58 to drive at a reduced speed ratio.

In this mode, the torque $T_{out}$ of the output shaft 12 is $T1(1+\alpha 1)\alpha 1+T2(1+\alpha 3)/\alpha 3$.

The second M/G 58 may drive the vehicle backward only by the engagement of the first fixing device 52*a*, which is not shown in the table. In this mode, the torque $T_{out}$ is $T2(1+\alpha 3)/\alpha 3$.

An EB mode is the same as that of the first embodiment.

An HEV mode will be described.

In the HEV mode, the first overrunning clutch 54 is always automatically engaged, and the input shaft 10 drives the first ring gear 24.

To start the engine 1, the second clutch 68 is engaged and the first M/G 56 drives in the reverse rotational direction similarly to the operation of the second embodiment while the vehicle stops or it runs at low speed.

On the other hand, when the vehicle runs at a speed higher than a predetermined one, the engine 1 can be rotated in the positive rotational direction by the engagement of the second clutch 68 and the generation of the first M/G 56.

To establish an H-1 mode, the second overrunning clutch 74 is engaged to fix the third ring gear 44 on the case 52. Therefore, the vehicle is driven similarly to the operation of the H-1 mode of the second embodiment.

To establish an H-2 mode, the first clutch 60 is engaged and the second overrunning clutch 74 is engaged to connect the input shaft 10 with the third sun gear 42. As a result, the vehicle runs at a reduced speed ratio of $(1+\alpha 3)/\alpha 3$ by using the third planetary gear set 40.

To establish an H-3 mode, the first M/G 56 is supplied with some electric power to maintain its rotational speed to be 0, and accordingly the vehicle runs at a reduced speed ratio of $1+\alpha 1$ by using the first planetary gear set 20. In this mode, the second M/G 58 rotates when the first clutch 60 continues to be engaged, while it stops when the first clutch 60 is disengaged.

To establish an H-4 mode, the first clutch 60 is engaged similarly to the operation in the H-2 mode, and accordingly the vehicle runs similarly to the operation in the H-4 mode of the second embodiment.

To establish an H-R mode, the first fixing device 52*a* is engaged, and accordingly the vehicle runs similarly to the operation of the H-1 mode except its rotational direction.

The drive device of the third embodiment cannot drive at an overdrive ratio because it has not the second planetary gear set 30 of the first embodiment, but it has the following advantages in addition to those of the first embodiment.

The construction is simple, and accordingly it is easy to mount on small cars.

Further, the first and second clutches 60 and 68 can be arranged between the engine 1 and the second M/G 58, and accordingly the clutches may employ a dry-type clutch. In addition, it may have a spring to always act its elastic force to engage the clutch. Therefore, the drive device may remove an oil pump, improving manufacturing costs and fuel consumption.

Next, a fourth embodiment of the present invention will be described.

Figure 12:
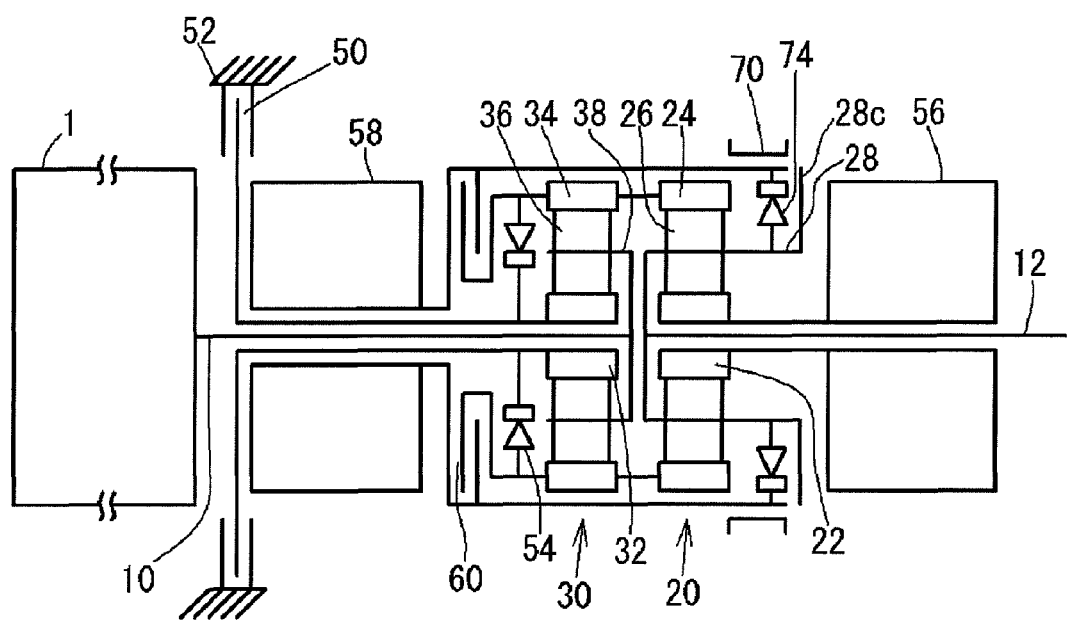
FIG. 12 is a power train of a drive device for a hybrid electric vehicle of a fourth embodiment according to the present invention.

FIG. 12 shows a power train of a drive device for a hybrid electric vehicle of the fourth embodiment.

The fourth embodiment is different from the first embodiment in that the third planetary gear set 40 of the first embodiment is removed.

A connection relationship of rotational members is as follows.

A second M/G 58 is connectable with a first carrier 28 through a second overrunning clutch 74 and also by using a sleeve 70 and a dog clutch 28*c* similarly to the operation of the first embodiment.

The second M/G 58 is connectable with a second ring gear 34 and a first ring gear 24 through a clutch 60.

A brake 50 is arranged at a position different from that of the first embodiment, but their functions are the same.

The other connection relationship in the fourth embodiment is similar to that of the first embodiment.

The fourth embodiment does not include the third planetary gear set 40, so that the torque $T_{out}$ of the output shaft 12 is different from that of the first embodiment. In this mode, the operation table in this mode is the same as that in the first embodiment, and the torque $T_{out}$ in every mode can be obtained by replacing I by 1 in the formulas in the first embodiment.

The fourth embodiment has the following advantages in addition to those of the first embodiment.

The construction of the fourth embodiment is simple and compact, which enables the drive device of the fourth embodiment to be easily mounted on small cars.

Further, the first and second clutches 60 and 68 can be arranged between the engine 1 and the second M/G 58, and accordingly the clutches may employ a dry-type clutch. In addition, it may have a spring to always act its elastic force to engage the clutch. Therefore, the drive device may remove an oil pump, improving manufacturing costs and fuel consumption.

Next, a fifth embodiment of the present invention will be described.

Figure 13:
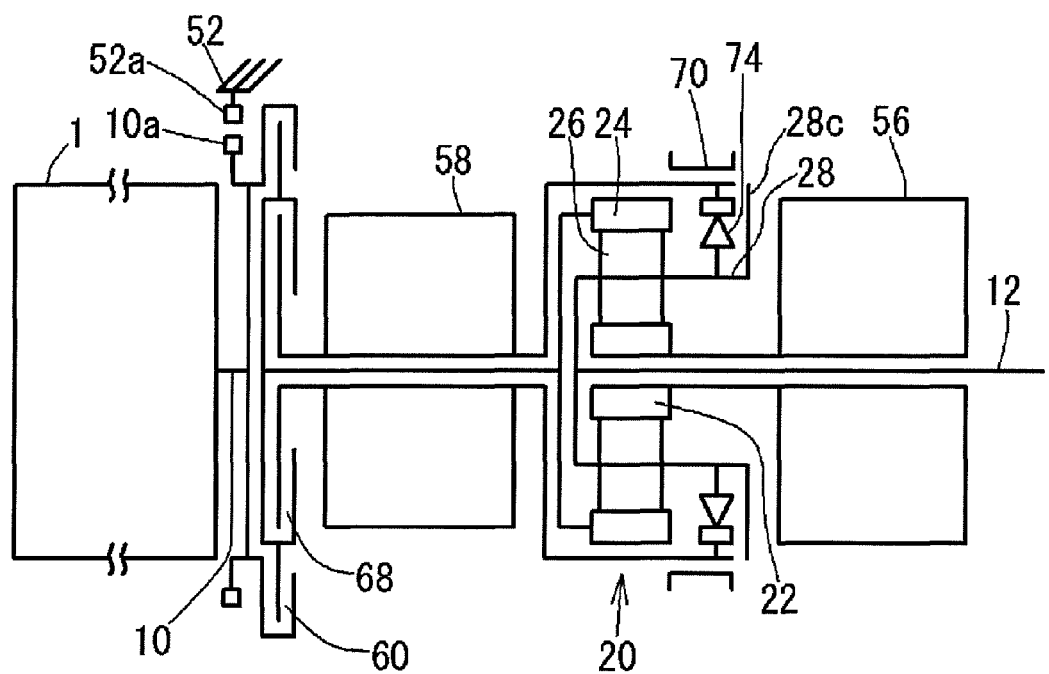
FIG. 13 is a power train of a drive device for a hybrid electric vehicle of a fifth embodiment according to the present invention.

FIG. 13 shows a power train of a drive device for a hybrid electric vehicle of the fifth embodiment.

The fifth embodiment is different from the first embodiment in that the second planetary gear set 30 and the third planetary gear set 40 are removed.

The connection relationship in the fifth embodiment is as follows.

An input shaft 10 is connectable with a first ring gear 24 through a first clutch 60. A second M/G 58 is connectable with a first carrier 28 through a second overrunning clutch 4, and also through the sleeve 70 and a dog clutch 28*c*.

The second M/G 58 is further connectable with a first ring gear 24 through a second clutch 68.

A fixing device 52*a* is provided to mechanically fix the input shaft 10 on a stationary part (a case 52 or a body of an engine 1).

The input shaft 10 is formed with a dog clutch 10*a*, which is engageable with the fixing device 52*a* when the input shaft 10 is fixed. The fixing device 52 is engaged with the dog clutch 10*a* in principle in a state where the engine 1 stops. The other connection relationship is similar to that of the first embodiment.

FIG. 14 shows an operation table of the drive device of the fifth embodiment.

The first clutch 60 is indicated as "C1", the second clutch 68 is indicated as "C2", the fixing device 52a is indicated as "L", the second overrunning clutch 74 is indicated as "OWC", and others are indicated as those in the first embodiment shown in FIG. 5.

To establish an HH mode, the fixing device 52a is engaged with the dog clutch 10a to fix the input shaft 10. Then the first and second clutches 60 and 68 are engaged to fix the second M/G 58 on the case 42, so that the drive device of the fifth embodiment can exert the hill-hold function.

At this time, the first M/G 56 can stop.

To establish an E-2 mode, the second clutch 68 is engaged to connect the second M/G 58 with the first ring gear 24, so that the both of the first and second M/Gs 56 and 58 drive. In this operation, the rotational speed of the output shaft 12 is always equal to or higher than that of the second M/G 58.

To establish an E-R mode, the fixing device 52a and the first clutch 60 are engaged to fix the first ring gear 24. Thus, the first M/G 56 drives at a reduced speed ratio and the second M/G 58 drives, which enables the vehicle to run backward. The torque $T_{out}$ is $-\{T1(1+\alpha 1)/\alpha 1+T2\}$.

An E-B mode is essentially similar to the operation of the fourth embodiment because the drive device of the fifth embodiment does not include the third planetary gear set 40 of the first embodiment.

In addition, the drive device of the fifth embodiment has not the H-2 mode, the H-5 mode, and the H-6 mode because it does not include the second planetary gear set 30 and the third planetary gear set 40 of the first embodiment.

An H-1 mode of the fifth embodiment is similar to that of the fourth embodiment, An H-2 mode of the fifth embodiment is similar to the H-3 mode of the fourth embodiment, and an H-3 mode of the fifth embodiment is similar to the H-4 mode of the fourth embodiment.

The fifth embodiment has the following advantages in addition to those of the first embodiment, although the fifth embodiment is different in reduced speed ratios and drive modes from the first embodiment because it does not include the second planetary gear set 30 and the third planetary gear set 40 of the first embodiment.

The construction of the fourth embodiment is simple and compact, which enables the drive device of the fourth embodiment to be easily mounted on small cars.

Further, the first and second clutches 60 and 68 can be arranged between the engine 1 and the second M/G 58, and accordingly the clutches may employ a dry-type clutch. In addition, it may have a spring to always act its elastic force to engage the clutch. Therefore, the drive device may remove an oil pump, improving manufacturing costs and fuel consumption.

Next, a sixth embodiment of the present invention will be described.

Figure 15:
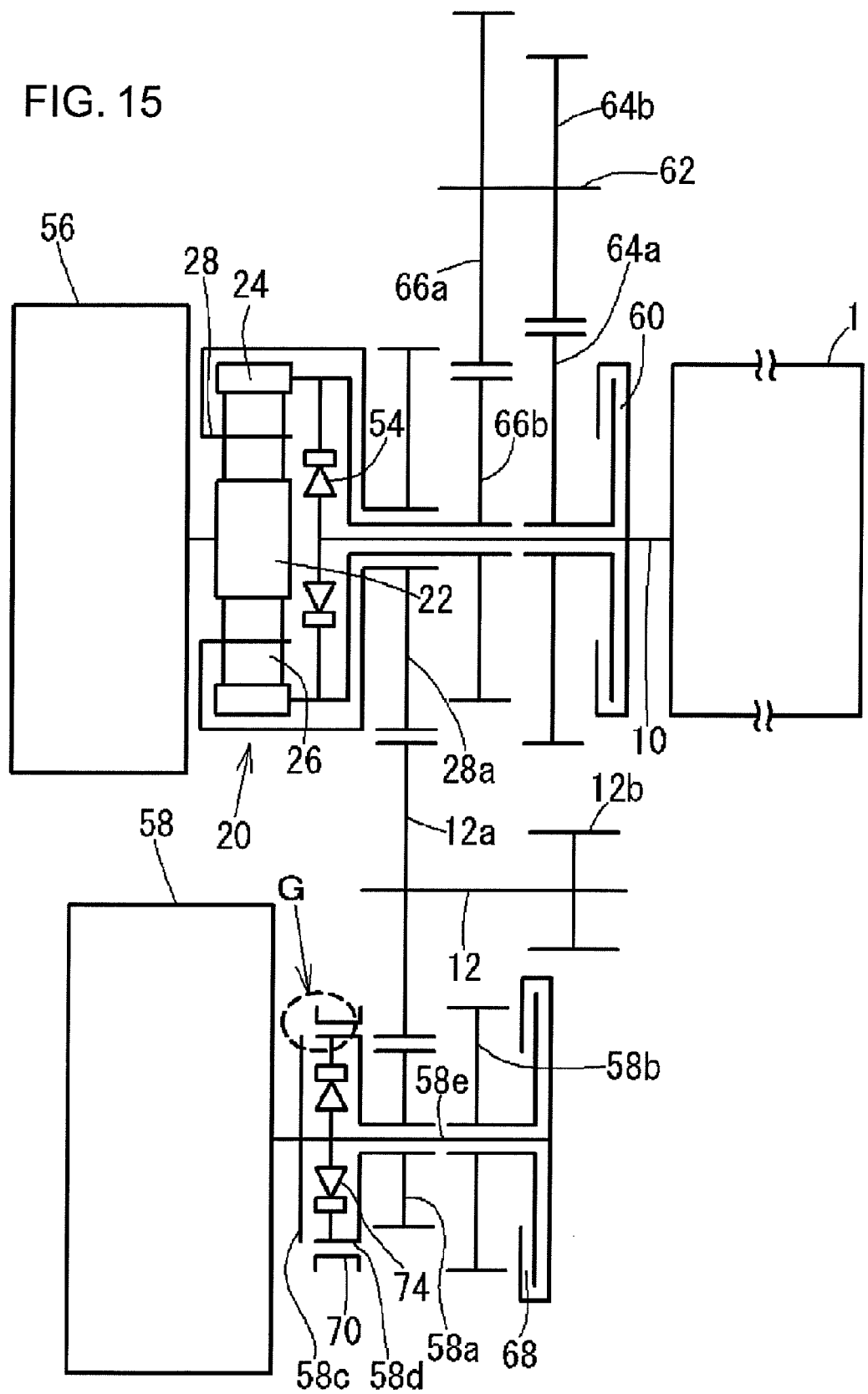
FIG. 15 is a power train of a drive device for a hybrid electric vehicle of a sixth embodiment according to the present invention.

FIG. 15 shows a power train of a drive device for a hybrid electric vehicle of the sixth embodiment.

The sixth embodiment is different from the first embodiment in that an output shaft 12 is arranged parallel to an input shaft 10 and an output gear 12b drives a vehicle through a not shown differential gear set.

In addition, it is different from the first embodiment in that each of an input speed-change gear set and a reduction gear set of the present invention does not employ a planetary gear set.

The input speed-change gear set employs four on-parallel-shaft gears; input gears 64a, 64b and drive gears 66a, 66b which are arranged between the input shaft 10 and a counter shaft 62 parallel to the input shaft 10. The input speed-change gear set can drive a first ring gear 24 at an overdrive speed ratio through a first clutch 60.

A second M/G 58 can drive the output shaft 12 at a reduced speed ratio through a drive shaft 58e, a second overrunning clutch 74, a first reduction gear 58a and a transmission gear 12a, and also through a dog clutch 58c and a sleeve 70 arranged parallel to the second overrunning clutch 74.

The dog clutch 58c and the sleeve 70 correspond to the mechanically connectable mechanism of the present invention. The first reduction gear 58a and the transmission gear 12a correspond to a fourth gear set of the invention.

The sleeve 70 always engages with splines 58d formed on the first reduction gear 58b, being capable of moving in a shaft direction. When the sleeve 70 moves to a left side in FIG. 15, it is engaged with the dog clutch 58c, so that the drive shaft 58c and the first reduction gear 58b are mechanically connected with each other.

The first reduction gear 58a and the transmission gear 12a correspond to a reduction gear set of the present invention.

The second M/G 58 is capable of driving the input gear 64b through the second clutch 68 and the second reduction gear 58b, and it is capable of driving the first ring gear 24 at a reduced speed ratio through the counter shaft 62 and the drive gears 66a, 66b. The gear 58b and the drive gears 66a, 66b correspond to a fifth gear set of the invention.

Although the second reduction gear 58b and the input gear 64b are apart from each other in FIG. 15, they are actually engaged with each other.

A connection relationship of rotating members including the input speed-change gear set is as follows.

The input shaft 10 is capable of driving the first ring gear 24 through the first overrunning clutch 54. In this case, the first overrunning clutch 54 is engaged only in the direction where the engine 1 drives in the positive rotational direction. The first clutch 60 and the first overrunning clutch 54 are engaged at the same time to fix the first ring gear 24 on the case 52, corresponding to a fixing mechanism of the present invention.

The input shaft 10 is connectable with the input gear 64a through the first clutch 60, and it is capable of driving the first ring gear 24 at an overdrive speed ratio through the input gear 64b, the counter shaft 62 and the drive gears 66a, 66b.

Accordingly, the teeth of the input gears 64a, 64b and the drive gears 66a, 66b are set so that they can provide overdrive speed ratios. The other connection relationship of the sixth embodiment is essentially similar to that of the first embodiment.

FIG. 16 shows an operation table of the drive device of the sixth embodiment.

The first clutch 60 is indicated as "C1", the second clutch 68 is indicated as "C2", the sleeve 70 is indicated as "S", and others are indicated as those in the first embodiment shown in FIG. 5.

The second clutch 68 (C2) functions as the clutch 60 (C) of the first embodiment, the first clutch 60 (C1) function as the brake 50 of the first embodiment, and the sleeve 70 (S) functions as the fixing device (L) of the first embodiment, so that the connection relationship of the sixth embodiment is substantially similar to that of the first embodiment except that the second reduction gear 58b is engaged with the input gear 64b to drive the first ring gear 24 at the reduced speed ratio in the sixth embodiment.

The torque of the output shaft 12 in every drive mode is affected by teeth ratios of the transmission gears 28a, 12a, the input gears 64a, 64b, the drive gears 66a, 66b, the first and second reduction gears 58a, 58b and gears 12a, 64, while the torque in every mode is essentially similar to that of the first embodiment. The transmission gears 28a, 12a correspond to a third gear set of the invention.

In the sixth embodiment, the on-parallel-shaft gear set functions as the second planetary gear set 30 and the third planetary gear set 40.

Therefore, the sixth embodiment has the advantages similar to those of the first embodiment. In addition, the drive device of the sixth embodiment can be applied to a front engine, front-wheel drive car.

Next, a seventh embodiment of the present invention will be described.

Figure 17:
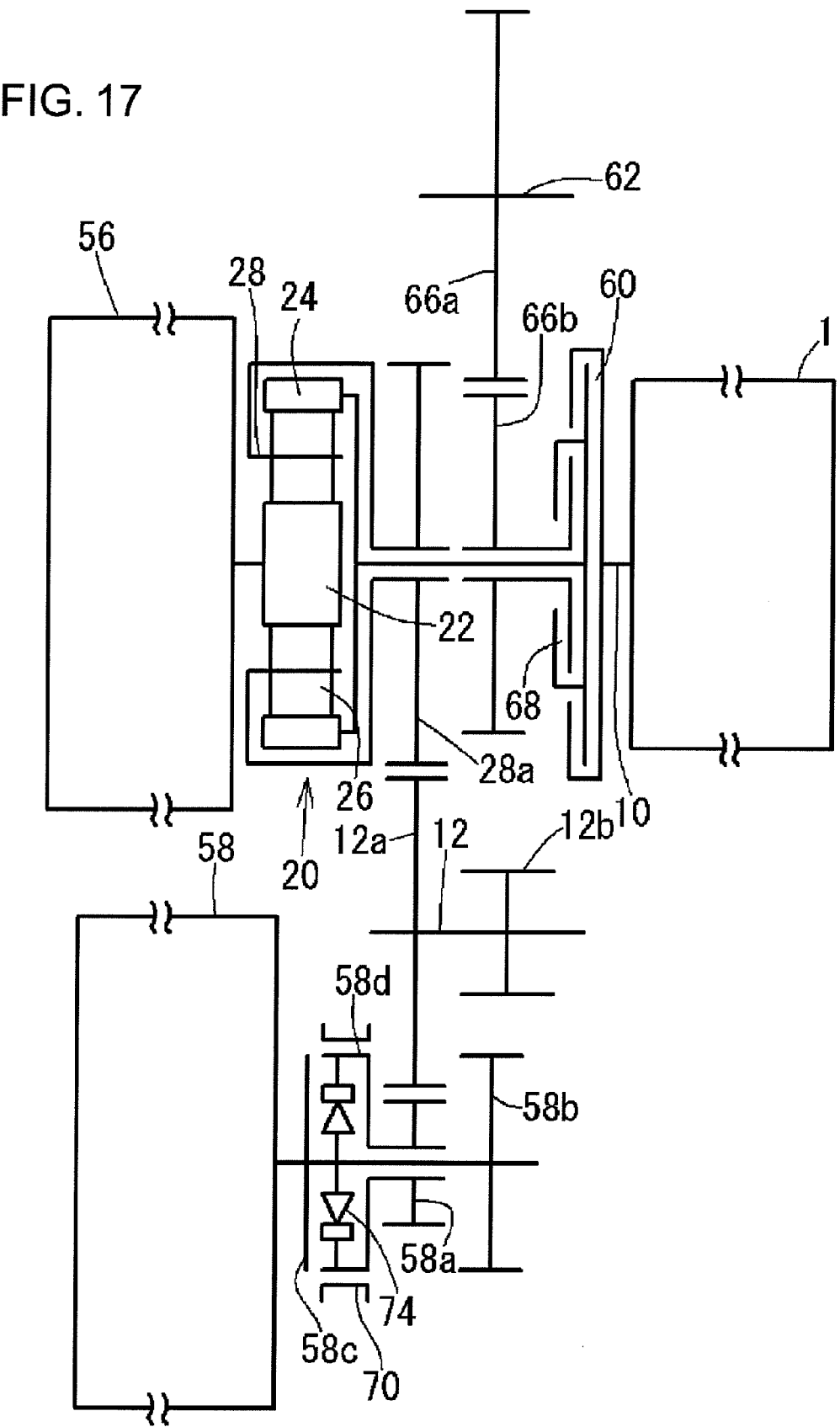
FIG. 17 is a power train of a drive device for a hybrid electric vehicle of a seventh embodiment according to the present invention.

FIG. 17 shows a power train of a drive device for a hybrid electric vehicle of the seventh embodiment.

The seventh embodiment is different from the first embodiment in that an output shaft 12 is arranged parallel to an input shaft similarly to the sixth embodiment. In addition, the input speed-change gear set is removed similarly to the third embodiment.

A connection relationship of the seventh embodiment is as follows.

The input shaft 10 is capable of directly driving a first ring gear 24 through a first clutch 60.

A first carrier 28 is connected with an output shaft 12 through connecting gears 28a, 12a.

The teeth ratio of the connecting gears 28a, 12a is preferably set so that a first carrier 28 drives the output shaft 12 at an overdrive speed ratio.

Similarly to the sixth embodiment, a second M/G 58 is arranged parallel to the output shaft 12, and it is capable of driving the output shaft 12 at a reduction speed ratio through a second overrunning clutch 74 and first reduction gears 58a, 12a and also through a dog clutch 58c and a sleeve 70 arranged parallel to the second overrunning clutch 74.

The dog clutch 58c and the sleeve 70 correspond to the mechanically connectable mechanism of the present invention.

The second M/G 58 is also connectable with a second reduction gear 58b, drive gears 66a, 66b arranged between the input shaft 10 and a counter shaft 62, and a first ring gear 24 through a second clutch 68.

Although the second reduction gear 58b and the drive gear 66a are apart from each other in FIG. 17, they are actually engaged with each other.

The other connection relationship of the seventh embodiment is similar to that of the first embodiment.

FIG. 18 shows an operation table of the drive device of the seventh embodiment. In FIG. 18, the first overrunning clutch 54 of the sixth embodiment is removed and the second overrunning clutch 74 is indicated as "OWC". The "L1" of the fixing device 52a is replaced by "S" of the sleeve 70.

The drive device of the seventh embodiment does not include the first overrunning clutch 54 and the second fixing device 52g, so that it does not provide the hill-holding function, that is, it has not the HH mode, while its drive modes are essentially similar to those of the third embodiment.

The torque of the output shaft 12 in every drive mode is affected by teeth ratios of the first reduction gears 58a, 12a, the second reduction gear 58b, the drive gears 66a, 66b, while the torque in every mode is essentially similar to that of the first embodiment.

The seventh embodiment has the advantages similar to those of the first embodiment except the function of the second planetary gear set 30. In addition, as the axial length of the drive device of the seventh embodiment can be small, it is suitable for cars with a small width.

While there have been particularly shown and described with reference to preferred embodiments thereof, it will be understood that various modifications may be made therein, and it is intended to cover in the appended claims all such modifications as fall within the true spirit and scope of the invention.

The entire contents of Japanese Patent Applications No. 2011-223515 filed Oct. 8, 2011, 200, No. 2011-242747 filed Nov. 4, 2011, and No. 2011-263191 filed Dec. 1, 2011 No. 2012-041568 filed Feb. 28, 2012 are incorporated herein by reference.

What is claimed is:

1. A drive device for a hybrid electric vehicle, the drive device comprising:
an input shaft to which an engine is capable of inputting power;
an output shaft;
a power splitting gear set including a first planetary gear set having three rotatable elements of a first sun gear, a first ring gear and a first pinion carrier;
a first motor/generator;
a second motor/generator;
a stationary part; and
an input speed-change gear set provided between the input shaft and the first ring gear to shift between a low-speed gear position and a high-speed gear position, wherein
the input speed-change gear set includes a first engaging element to transmit power at the low-speed gear position and a second engaging element to transmit the power at the high-speed gear position,
the input shaft is connectable with the first ring gear,
the output shaft is connected with the first pinion carrier,
the first motor/generator is connected with the first sun gear,
the second motor/generator is connectable with the output shaft and the first ring gear,
the first ring gear is capable of being fixed to the stationary part, and
the first ring gear is fixed to the stationary part when the first engaging element and the second engaging element are engaged at a same time.

2. The drive device according to claim 1, further comprising:
a first overrunning clutch provided between the input shaft and the first ring gear, wherein
the first overrunning clutch is automatically engaged in a direction where the input shaft drives the first ring gear.

3. The drive device according to claim 1, wherein
the first engaging element comprises a first overrunning clutch.

4. The drive device according to claim 1, wherein
the second engaging element comprises a brake,
the input speed-change gear set further includes a second planetary gear set having three rotatable elements of a second sun gear, a second ring gear and a second pinion carrier,
the second pinion carrier is connected with the input shaft,
the second ring gear is connected with the first ring gear,
the second sun gear is fixable on the stationary part by the second engaging element, and
the first engaging element comprises a first overrunning clutch located at a position of one of between one of the second ring gear and the second pinion carrier and the second sun gear and between the first pinion carrier and the second pinion carrier.

5. The drive device according to claim 1, further comprising:
a first clutch, wherein
the input speed-change gear set further includes a first gear set and a second gear set between the input shaft and a counter shaft arranged parallel to the input shaft, the input shaft and the first ring gear are connectable with each other by the first engaging element, and the input shaft and the input speed-change gear set are connectable with each other by the first clutch arranged coaxially with the input shaft.

6. The drive device according to claim 2, further comprising:

a speed-reduction gear set provided between the output shaft and the second motor/generator.

7. The drive device according to claim 2, further comprising:

a third gear set configured to connect the first pinion carrier and an output gear;

a fourth gear set configured to be connectable with the second motor/generator and the output shaft; and a fifth gear set configured to be connectable with the input shaft and the second motor/generator, wherein the input shaft and the output shaft are configured to be arranged parallel to each other, the power splitting planetary gear set is configured to be arranged coaxially with the input shaft, and the second motor/generator is configured to be arranged parallel to the output shaft.

8. The drive device according to claim 1, wherein the second engaging element
is capable of engaging to establish the high-speed gear position.

9. The drive device according to claim 8, wherein the second engaging element comprises a brake.

10. The drive device according claim 8, wherein
the second engaging element comprises a brake,
the input speed-change gear set further includes a second planetary gear set having three rotatable elements of a second sun gear, a second ring gear and a second pinion carrier,
the second pinion carrier is connected with the input shaft,
the second ring gear is connected with the first ring gear,
the second sun gear is fixable on the stationary part by the second engaging element, and
the first engaging element comprises a first overrunning clutch located at a position of one of between one of the second ring gear and the second pinion carrier and the second sun gear and between the first pinion carrier and the second pinion carrier.

11. The drive device according to claim 8, further comprising:

a first clutch, wherein
the input speed-change gear set further includes a first gear set and a second gear set between the input shaft and a counter shaft arranged parallel to the input shaft,
the input shaft and the first ring gear are connectable with each other by the first engaging element, and
the input shaft and the input speed-change gear set are connectable with each other by the first clutch arranged coaxially with the input shaft.

12. The drive device according to claim 8, further comprising:

a speed-reduction gear set provided between the output shaft and the second motor/generator.

13. The drive device according to claim 8, further comprising:

a third gear set configured to connect the first pinion carrier and an output gear;

a fourth gear set configured to be connectable with the second motor/generator and the output shaft; and a fifth gear set configured to be connectable with the input shaft and the second motor/generator, wherein the input shaft and the output shaft are configured to be arranged parallel to each other, the power splitting gear set is configured to be arranged coaxially with the input shaft, and the second motor/generator is configured to be arranged parallel to the output shaft.

14. The drive device according to claim 1, further comprising:

a speed-reduction gear set provided between the output shaft and the second motor/generator.

15. The drive device according to claim 14, further comprising:

an overrunning clutch provided in a power transmitting path of the speed-reduction gear set, wherein the overrunning clutch is engaged when the second motor/generator drives in a forward vehicle running.

16. The drive device according to claim 15, further comprising:

a mechanically engageable mechanism provided parallel to the overrunning clutch.

17. The drive device according to claim 16, further comprising:

an elastic member, wherein a rotational play is provided at a position of one of an upstream side and a downstream side in the power transmitting path of the overrunning clutch, the elastic member acts elastic force to form rotational play in a rotational direction where the overrunning clutch is engaged.

18. The drive device according to claim 14, wherein
the speed-reduction gear set that employs a third planetary gear set having three rotatable elements of a third sun gear, a third ring gear and a third pinion carrier,
the third pinion carrier is connectable or connected with the output shaft, the second motor/generator is connected with one of the third sun gear and the third ring gear, and
another of the third sun gear and the third ring gear is capable of being fixed to the stationary part.

19. The drive device according to claim 1, further comprising:

a speed-reduction gear set that employs a third planetary gear set having three rotatable elements of a third sun gear, a third ring gear and a third pinion carrier, wherein
the third pinion carrier is connectable or connected with the output shaft,
the second motor/generator is connected with one of the third sun gear and the third ring gear, and
another of the third sun gear and the third ring gear is capable of being fixed to the stationary part.

\* \* \* \* \*